US012060748B2

(12) United States Patent
Bernhagen et al.

(10) Patent No.: US 12,060,748 B2
(45) Date of Patent: Aug. 13, 2024

(54) SLIDING FENESTRATION UNIT WITH COPLANAR PANELS

(71) Applicant: Pella Corporation, Pella, IA (US)

(72) Inventors: Todd A. Bernhagen, Pella, IA (US); Paul D. Schroder, Pella, IA (US)

(73) Assignee: Pella Corporation

( * ) Notice: Subject to any disclaimer, the term of this patent is extended or adjusted under 35 U.S.C. 154(b) by 866 days.

(21) Appl. No.: 17/087,443

(22) Filed: Nov. 2, 2020

(65) Prior Publication Data

US 2021/0254394 A1 Aug. 19, 2021

Related U.S. Application Data

(63) Continuation of application No. 16/402,014, filed on May 2, 2019, now Pat. No. 10,822,863.

(Continued)

(51) Int. Cl.

*E06B 3/46* (2006.01)
*E06B 7/16* (2006.01)

(52) U.S. Cl.

CPC .............. *E06B 3/4609* (2013.01); *E06B 7/16* (2013.01); *E05Y 2900/132* (2013.01); *E05Y 2900/148* (2013.01)

(58) Field of Classification Search

CPC ................. E06B 3/4609; E06B 3/6617; E06B 3/663304; E06B 3/663309; E05Y 2900/148

See application file for complete search history.

(56) References Cited

U.S. PATENT DOCUMENTS

| | | | |
|---|---|---|---|
| 782,139 | A | 2/1905 | Jones |
| 2,317,312 | A | 4/1943 | Swanson et al. |

(Continued)

FOREIGN PATENT DOCUMENTS

| | | | |
|---|---|---|---|
| CA | 2969055 | A1 | 6/2016 |
| DE | 2912256 | A1 | 10/1980 |

(Continued)

OTHER PUBLICATIONS

Hoppe. “Parallel-Retract and Slide,” product brochure, available at least as early as Dec. 12, 2017, 2 pages.

(Continued)

*Primary Examiner* — Babajide A Demuren
(74) *Attorney, Agent, or Firm* — FAEGRE DRINKER BIDDLE & REATH

(57) ABSTRACT

A fenestration unit including a first panel having a leading portion and a trailing portion, a second panel, and a frame including a first lateral member and a second lateral member. The first lateral member has a trolley space configured to slideably receive a trolley assembly. The trolley assembly includes a first trolley coupled to the leading portion of the first panel and a second trolley coupled to the trailing portion of the first panel. Each of the first and the second trolleys includes a guide pin slideably received in the leading and trailing tracks, respectively. The guide pins are configured to guide the first panel out of a coplanar relationship with the second panel when the first panel is slid to an opened position and guide the first panel into a coplanar relationship with the second panel when the first panel is slid to a closed position.

19 Claims, 8 Drawing Sheets

Related U.S. Application Data

(60) Provisional application No. 62/665,774, filed on May 2, 2018.

(56) References Cited

U.S. PATENT DOCUMENTS 2,680,268 A 6/1954 Rutherford
3,041,680 A 7/1962 Gurniak
3,303,612 A 2/1967 Baker
3,810,330 A 5/1974 Daggy
4,324,072 A 4/1982 Sterner, Jr.
4,384,429 A 5/1983 Rokicki et al.
4,570,381 A 2/1986 Sterner, Jr.
4,603,452 A 8/1986 Paciorek
4,619,074 A 10/1986 Leung et al.
4,682,455 A 7/1987 Klompenburg
5,058,321 A 10/1991 Harbom et al.
5,131,449 A 7/1992 Winn et al.
5,153,034 A 10/1992 Telchuk et al.
5,394,648 A 3/1995 Kordes
5,448,858 A 9/1995 Briggs et al.
5,486,026 A 1/1996 Borgardt
5,548,926 A 8/1996 Jarmo
5,596,842 A 1/1997 Jarmo
5,832,980 A 11/1998 Cianciolo
5,927,014 A 7/1999 Goldenberg
5,996,282 A 12/1999 Giovannetti
6,052,867 A 4/2000 Haab et al.
6,142,082 A 11/2000 Burke et al.
6,148,896 A 11/2000 Pinto et al.
6,167,936 B1 1/2001 Stover et al.
6,170,207 B1 1/2001 Saindon
6,176,041 B1 1/2001 Roberts
6,216,392 B1 4/2001 DiGinosa
6,233,888 B1 5/2001 Wu
6,238,374 B1 5/2001 Winkler
6,276,092 B1 * 8/2001 Neo .................... E05D 15/0604 49/176
6,336,246 B1 1/2002 Giovannetti
6,374,456 B1 4/2002 Fort et al.
6,405,781 B2 6/2002 Davies et al.
6,446,696 B1 9/2002 Davies et al.
6,454,320 B1 9/2002 Weinerman et al.
6,470,947 B1 10/2002 Holevas
6,497,072 B2 12/2002 Fries
6,526,695 B1 3/2003 Nguyen
6,550,184 B1 4/2003 O'Donnell et al.
6,618,994 B1 9/2003 Nussbaum
6,618,998 B1 9/2003 Thomas et al.
6,826,867 B1 12/2004 McDonald et al.
6,840,009 B2 1/2005 Ronay et al.
6,860,064 B2 3/2005 Bakalar
6,860,078 B1 3/2005 Geisthardt
6,899,362 B1 5/2005 Weinerman et al.
7,003,916 B2 2/2006 Nestell et al.
7,124,538 B1 10/2006 Kline
7,155,861 B2 1/2007 Berry et al.
7,155,863 B2 1/2007 Daniel et al.
7,219,470 B2 5/2007 Lahnala
7,255,045 B2 8/2007 Owens
7,451,802 B2 11/2008 Cianciolo et al.
7,584,574 B2 9/2009 Kinross et al.
7,610,718 B2 11/2009 Kopish
7,647,728 B2 * 1/2010 Bortoluzzi .......... E05D 15/1042 49/209
7,647,729 B2 1/2010 Polus
7,673,419 B2 3/2010 Arimoto
D616,566 S 5/2010 Desrosiers et al.
D616,567 S 5/2010 Desrosiers et al.
D616,568 S 5/2010 Desrosiers et al.
7,735,897 B2 6/2010 Seiple et al.
7,819,167 B2 10/2010 Morin
7,861,475 B2 1/2011 Sprague
7,934,342 B2 5/2011 Lahnala
7,963,070 B2 6/2011 Recker
7,980,027 B2 7/2011 Kraus et al.
8,065,779 B2 11/2011 Kuchas
8,112,954 B2 2/2012 Gosling et al.
8,113,607 B2 2/2012 Slager et al.
8,181,394 B2 5/2012 Michaels
8,235,085 B2 8/2012 Coleman et al.
8,261,500 B2 9/2012 Sprague
8,297,334 B2 10/2012 Chu
8,375,645 B2 2/2013 Iwauchi et al.
8,375,646 B2 2/2013 Newkirk et al.
8,381,443 B2 2/2013 Smith et al.
8,381,444 B1 2/2013 McDonald et al.
8,387,309 B2 3/2013 Tseng
8,438,783 B2 5/2013 Giovannetti
8,448,688 B2 5/2013 Goodman et al.
8,479,798 B2 7/2013 Goodman
8,496,038 B2 7/2013 Kondash et al.
8,627,604 B2 1/2014 Seymour et al.
8,665,582 B2 3/2014 Robinson et al.
8,677,688 B2 3/2014 Skibinski et al.
8,756,864 B2 6/2014 Hamaker et al.
8,756,865 B2 6/2014 Nicholson et al.
8,757,238 B2 6/2014 Goodman et al.
8,826,964 B2 9/2014 Goodman
8,905,500 B2 12/2014 Larson et al.
8,919,860 B2 12/2014 Thiele
8,950,114 B1 2/2015 Groening
8,955,195 B2 2/2015 Chang et al.
8,955,260 B2 2/2015 Newkirk et al.
8,960,257 B2 2/2015 Goodman
8,984,810 B2 3/2015 Bortoluzzi et al.
9,016,762 B2 4/2015 Ojima et al.
9,027,295 B2 5/2015 Kopish et al.
9,074,420 B2 7/2015 Goodman et al.
9,157,264 B2 10/2015 Bortoluzzi et al.
9,200,860 B1 12/2015 Groening
9,282,831 B2 3/2016 Scibetta et al.
D757,300 S 5/2016 Haberland et al.
9,416,576 B2 8/2016 Andersson et al.
9,447,579 B2 9/2016 Kopish et al.
9,470,028 B2 10/2016 Header et al.
9,637,961 B2 5/2017 Header et al.
9,663,980 B2 5/2017 Bakalar
9,970,232 B2 5/2018 Koenitz
10,077,588 B1 9/2018 Header
10,415,289 B2 9/2019 Hailey et al.
10,472,872 B2 11/2019 Ingram et al.
10,526,831 B2 1/2020 Haworth
10,641,031 B2 5/2020 Koenitz
10,822,863 B2 11/2020 Bernhagen et al.
11,286,709 B2 3/2022 Bernhagen et al.
2001/0037613 A1 11/2001 Owens
2003/0070363 A1 4/2003 Bakalar
2003/0150165 A1 8/2003 Ronay et al.
2005/0044798 A1 3/2005 Daniel et al.
2006/0225357 A1 10/2006 Bortoluzzi
2007/0062122 A1 3/2007 Polus
2007/0261799 A1 11/2007 Chu
2008/0078216 A1 4/2008 Fleming
2008/0100093 A1 5/2008 Seiple et al.
2008/0302016 A1 12/2008 Halfon et al.
2008/0302021 A1 12/2008 Gosling et al.
2009/0126279 A1 5/2009 Kopish
2010/0199563 A1 8/2010 Bortoluzzi
2010/0205865 A1 8/2010 Iwauchi et al.
2010/0212233 A1 8/2010 Robinson et al.
2010/0281931 A1 11/2010 Slager et al.
2010/0299871 A1 12/2010 Kondash et al.
2011/0093095 A1 4/2011 Goodman et al.
2011/0126463 A1 6/2011 Skibinski et al.
2011/0185638 A1 8/2011 Giovannetti
2011/0186249 A1 8/2011 Coleman et al.
2012/0005960 A1 1/2012 Tseng
2012/0043865 A1 2/2012 Newkirk et al.
2013/0082582 A1 4/2013 Newkirk et al.
2014/0013685 A1 1/2014 Coleman et al.
2014/0182212 A1 7/2014 Bortoluzzi et al.
2015/0376939 A1 12/2015 Bakalar
2019/0323275 A1 10/2019 Stell

(56) References Cited

U.S. PATENT DOCUMENTS

| | | | |
|---|---|---|---|
| 2019/0338581 | A1 | 11/2019 | Bernhagen et al. |
| 2020/0002986 | A1 | 1/2020 | Smith |
| 2020/0217124 | A1 | 7/2020 | Bernhagen et al. |
| 2021/0131165 | A1 | 5/2021 | Bernhagen et al. |
| 2021/0222473 | A1 | 7/2021 | Procton et al. |

FOREIGN PATENT DOCUMENTS

| | | | |
|---|---|---|---|
| DE | 29614902 | U1 | 1/1998 |
| DE | 102010037604 | A1 | 9/2011 |
| EP | 0605353 | A1 | 7/1994 |
| EP | 3315700 | A1 | 5/2018 |
| FR | 3018306 | A1 | 9/2015 |
| FR | 3095224 | A1 | 10/2020 |
| GB | 2558375 | A | 7/2018 |
| WO | 2007/068789 | A1 | 6/2007 |

OTHER PUBLICATIONS

Omnitrack. “9820 Omnitrack High Capacity Ball transfer Unit,” Revision 1, Jun. 22, 2012, 1 page. Retrieved from <URL:https://resources.omnitrack.com/files/pdf/9820_2D.pdf>.

* cited by examiner

SLIDING FENESTRATION UNIT WITH COPLANAR PANELS

CROSS-REFERENCE TO RELATED APPLICATION

This application is a continuation of U.S. application Ser. No. 16/402,014 filed May 2, 2019, which claims priority to Provisional Application 62/665,774 filed on May 2, 2018, both of which are herein incorporated by reference in their entirety.

TECHNICAL FIELD

Various aspects of the instant disclosure relate to fenestration products, such as sliding doors and windows. In some specific examples, the disclosure concerns sliding doors and windows configured for coplanar operation.

BACKGROUND

Traditionally, sliding doors and windows have an offset configuration in which one panel (e.g., sash or door panel) slides past an adjacent panel with the two panels being in an offset, planar arrangement in both open and closed states. In turn, hinged panels in such fenestration units typically begin in a coplanar arrangement in the closed state and then swing open angularly to an open state. Each arrangement has its own trade-offs. For example, sliding panels may not be capable of fully opening to create the widest possible opening for egress/ingress, while hinged panels require a clear path to swing open and closed.

SUMMARY

Various aspects of this disclosure relate to coplanar fenestration units, or coplanar panel fenestration units, such as coplanar sliding doors or windows having a first panel configured to transition in and out of a coplanar relationship with a second panel. In some examples, such a fenestration unit comprises a first panel having a leading portion and a trailing portion, a second panel, a frame supporting the first and second panels, and a trolley assembly. The frame includes a first lateral member and a second lateral member. The first lateral member of the frame has a width, a trolley space extending along the width of the first lateral member, a leading track, and a trailing track. The trolley assembly is slideably received in the trolley space of the first lateral member of the frame. The trolley assembly includes a first trolley coupled to the leading portion of the first panel, and a second trolley coupled to the trailing portion of the first panel. Each of the first and the second trolleys includes a guide pin having a longitudinal degree of freedom along the width of the first lateral member and a lateral degree of freedom perpendicular to the width of the first lateral member. The guide pin of the first trolley is slideably received in the leading track and the guide pin of the second trolley is slideably received in the trailing track such that the guide pins of the first and second trolleys guide the first panel out of a coplanar relationship with the second panel when the first panel is slid to an opened position and guide the first panel into a coplanar relationship with the second panel when the first panel is slid to a closed position.

In some examples, such a fenestration unit comprises a first panel having a leading end and a trailing end, a second panel, a frame, and a first sliding means. The frame includes a first guiding means for guiding the leading end of the first panel in and out of a coplanar relationship with the second panel, and a second guiding means for guiding the trailing end of the first panel in and out of the coplanar relationship with the second panel. The first sliding means is coupled to the first panel and slideably coupled to the frame. The first sliding means may be coupled to the first panel near the leading end, and a second sliding means of the fenestration unit may be coupled to the first panel near the trailing end. The first and second sliding means may be configured to slide the first panel in and out of the coplanar relationship with the second panel. The first sliding means may comprise a first support roller, and the second sliding means may comprise a second support roller.

While multiple inventive examples are specifically disclosed, various modifications and combinations of features from those examples will become apparent to those skilled in the art from the following detailed description. Accordingly, the disclosed examples are meant to be regarded as illustrative in nature and not restrictive.

Figure 1:
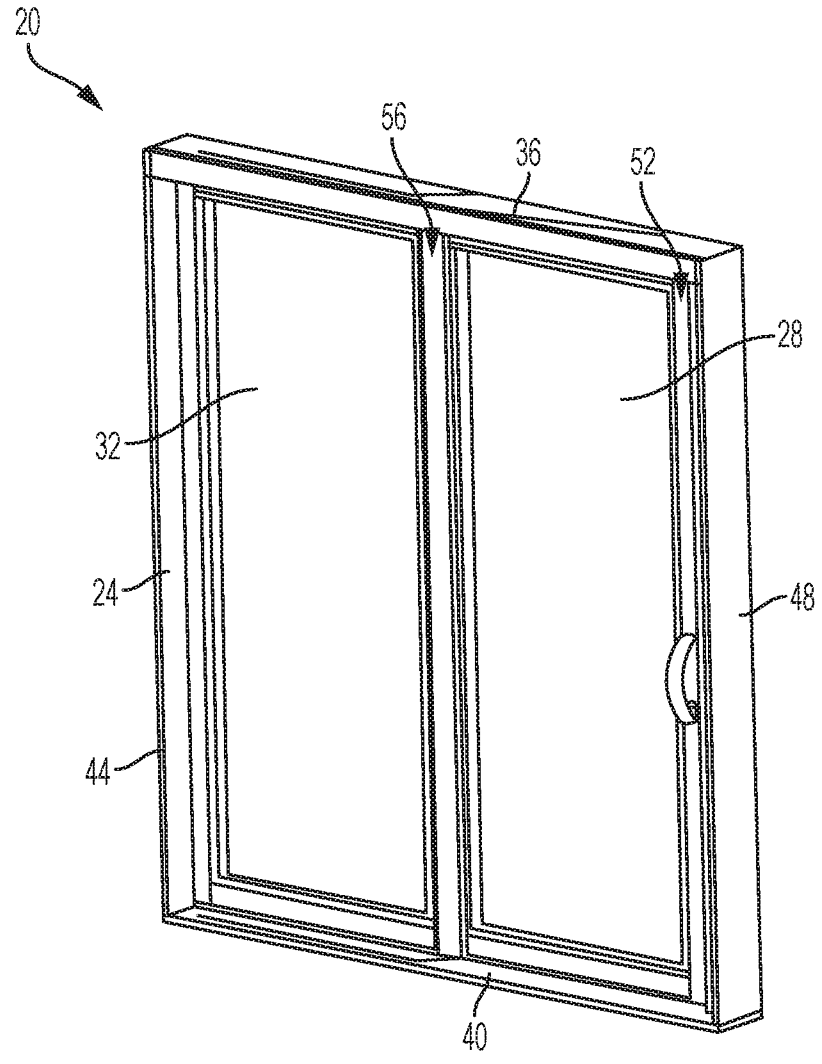
FIG. 1 is a schematic view of a coplanar fenestration unit, according to some examples.

While the disclosure is amenable to various modifications and alternative forms, specific embodiments have been shown by way of example in the drawings and are described in detail below. The disclosure, however, is not limited to the particular embodiments described. On the contrary, the disclosure is intended to cover all modifications, equivalents, and alternatives falling within the scope of the disclosure as defined by the appended claims.

DETAILED DESCRIPTION

Coplanar fenestration units according to the inventive examples may be adapted for sliding doors, sliding windows, and any other fenestration unit having a sliding panel. A coplanar fenestration unit provides aesthetically desired paralleled panel-to-panel, and/or panel-to-wall relationships in a closed state. The sliding mechanism helps minimize the space required to transition from the closed state to an opened state for the fenestration units when compared to others such as ones with hinged panels. For example, a fenestration unit in accordance with various embodiments of the present disclosure may include a first sliding panel and a second panel that may be a sliding panel, a hinged panel, a fixed panel, or combinations thereof.

For reference, the term "coplanar" as used herein is not meant to require two components having the same thickness (e.g., two door panels of the same thickness) and scenarios where both interior and exterior surfaces are aligned unless otherwise specified. Instead, the term "coplanar" as used herein is meant to encompass scenarios where the bodies of two objects would interfere with one another such that one panel could not otherwise be slid laterally relative to the other panel. In other words, unless otherwise specified, the term is meant to include scenarios in which some portions of each of the two objects (e.g., door panels) reside in the same plane and would interfere with one another if slid in a purely lateral direction.

FIG. 1 is a schematic view of a fenestration unit 20 in accordance to various embodiments. As shown, the fenestration unit 20 includes a frame 24, a first panel 28, and a second panel 32. The frame 24 is optionally formed of any of a variety of materials, including aluminum, vinyl, fiberglass, wood or other material as desired. The frame 24 has a width and includes a first lateral member 36 and a second lateral member 40 extending across the width of the frame 24. The frame 24 supports and/or houses the first and second panels 28, 32 between the first and second lateral members 36, 40. The frame 24 may also include a first longitudinal member 44 and a second longitudinal member 48 arranged apart from the first longitudinal member 44 by about the width of the frame 24. The first lateral member 36 may be a head of the fenestration unit 20. The second lateral member 40 may be a sill of the fenestration unit 20. The first and second longitudinal members 44, 48 may be first and second jambs of the fenestration unit 20. One or more of the first and second longitudinal members 44, 48 may be a lock jamb. The first panel 28 has a leading end or portion 52 that may be near one of the first and second longitudinal members 44, 48 in the closed state and a trailing end or portion 56 that may be near the other of the first and second longitudinal members 44, 48 in the open state. The second panel 32 may be slideably, hingedly, and/or fixedly coupled to the frame 24.

Figure 2:
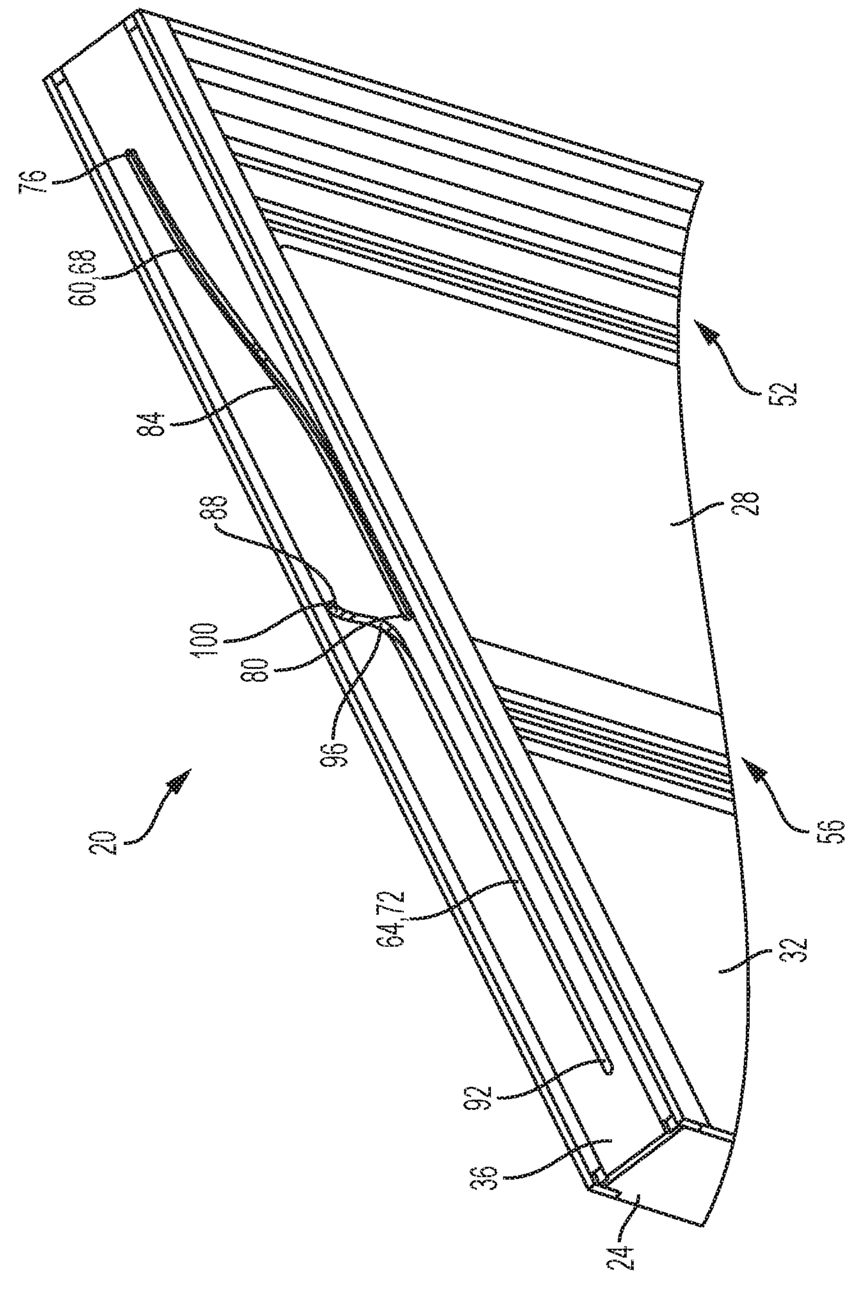
FIG. 2 is a schematic view of a first lateral member of the coplanar fenestration unit of FIG. 1, according to some examples.

FIG. 2 is a schematic view of the first lateral member 36 of the fenestration unit 20, according to some examples. The first lateral member 36 includes a first guiding means 60 and a second guiding means 64. The first guiding means 60 is configured such that the leading portion 52 of the first panel 28 may be slideably coupled to the frame 24 of the fenestration unit 20. The second guiding means 64 is configured such that the trailing portion 56 of the first panel 28 may be slideably coupled to the frame 24 of the fenestration unit 20. The first guiding means 60 is configured to guide the leading end 52 of the first panel 28 in and out of a coplanar relationship with the second panel 32 and/or a wall. The second guiding means 64 is configured to guide the trailing end 56 of the first panel 28 in and out of a coplanar relationship with the second panel 32 and/or a wall.

As shown, the first guiding means 60 may be a first guide track or leading track 68 and the second guiding means 64 may be a second guide track or trailing track 72. The leading and trailing tracks 68, 72 may be recessed into the first lateral member 36 of the frame 24. The leading and trailing tracks 68, 72 may be blind or through recesses. The leading track 68 includes a leading end 76, a trailing end 80, and one or more arced sections 84. In some examples, the leading track 68 is configured to limit the acceleration of the slideably coupled first panel 28 when transitioning between the closed and opened states. For example, a force applied to the first panel 28 by a user to transition the first panel 28 between the closed and opened states may be applied substantially laterally across the width of the frame 24 of the fenestration unit 20. The arced sections 84 of the leading track 68 may limit the acceleration of the first panel 28 in response to the force applied by providing a first resistive force in the counter direction of the applied force. The acceleration may be a lateral acceleration relating to the open/close motion.

In some examples, the trailing track 72 includes a leading end 88, a trailing end 92, and an angled section 96 extending substantially diagonally. The angled section 96 may be closer to the trailing end 92 of the trailing track 72 than the leading end 88 of the trailing track 72. In some examples, the trailing track 72 is configured to limit acceleration of the first panel 28. For example, a force applied to the first panel 28 by a user to transition the first panel 28 between the closed and opened states may be applied substantially laterally across the width of the frame 24 of the fenestration unit 20. The angled section 96 of the trailing track 72 may limit the acceleration of the first panel 28 in response to the force applied by providing a second resistive force in the counter direction of the applied force.

In some examples, the trailing track 72 includes a first straight section 100 near the leading end 88 of the trailing track 72. In some examples, the first straight section 100 helps improve wind load performance of the fenestration unit 20, such as by being substantially parallel to the first lateral member 36 of the frame 24. For example, a wind load may be substantially perpendicular to the first panel 28 and thus the first straight section 100 of the trailing track 72 may be substantially perpendicular to the wind load such that the first panel 28 is impeded from move along the trailing track 72 in response to the wind load. In various embodiments, the substantially perpendicular relationship between the straight section 100 and the wind load helps limit the reaction force created in response to the wind load to also be substantially perpendicular to the straight section. Similar straight sections may further be adapted for the trailing end 92 of the trailing track 72, the leading end 76 of the leading track 68, and/or the trailing end 80 of the leading track 68, to help further improve wind load performance of the fenestration unit 20. The straight sections may increase a magnitude of the wind load required to cause the first panel 28 of the fenestration unit 20, in the closed and/or opened states, to unintentionally move in response to the wind load. In various embodiments, each of the leading and trailing tracks 68, 72 may extend along the first lateral member 36 of the frame 24 by at least a width of the first panel 28.

Figure 3:
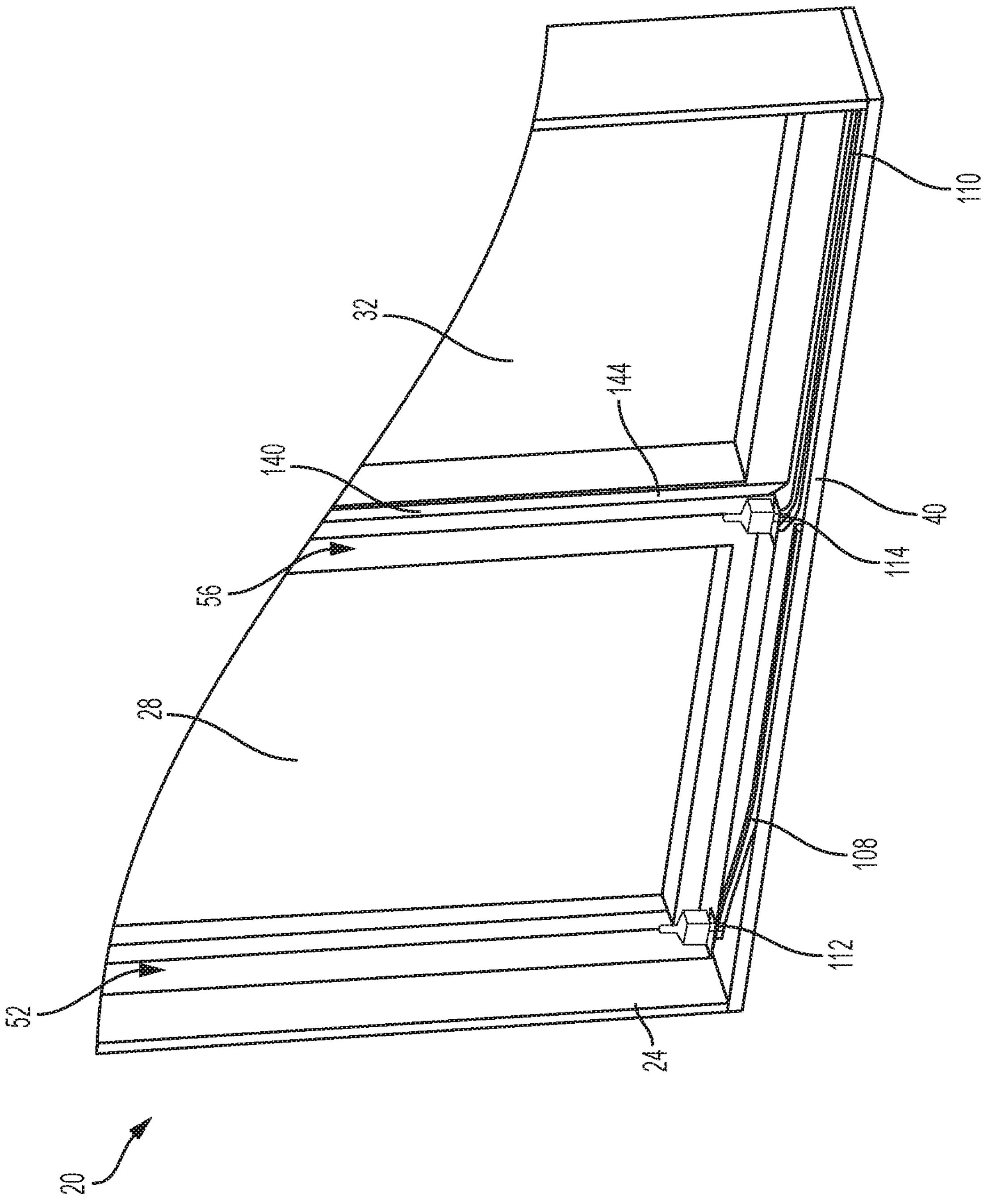
FIG. 3 is a schematic view of a second lateral member, according to some examples.

FIG. 3 is a schematic view of the second lateral member 40 of the fenestration unit 20, according to some examples. Similar to the first lateral member 36 (FIG. 2), the second lateral member 40 of the frame 24 may include one or more guiding means, which may be one or more tracks configured to guide the leading portion 52 (see FIG. 1) and/or the trailing portion 56 of the first panel 28 in and out of the coplanar relationship with the second panel 32 and/or the wall. The one or more tracks may include a first track 108 and a second track 110. Similar to the leading and trailing tracks 68, 72 of the first lateral member 36, the first and second tracks 108, 110 of the second lateral member 40 may include one or more straight sections, arced sections, and/or angled sections. The first panel 28 may include one or more guide pins configured to be slideably coupled to the leading track 68 of the first lateral member 36, the trailing track 72 of the first lateral member 36 (see FIG. 2), and/or the one or more tracks 108 of the second lateral member 40. The one or more guide pins may include a first guide pin 112 and a second guide pin 114. The first guide pin 112 may be disposed near the leading portion 52 of the first panel 28 and the second guide pin 114 may be disposed near the trailing portion 56 of the first panel 28. The first guide pin 112 may be slideably received in a first guiding means (e.g., the first track 108) of the second lateral member 40. The second guide pin 114 may be slideably received in a second guiding means (e.g., the second track 110) of the second lateral member 40.

As illustrated, the first panel 28 includes a slanted bevel 140 at the trailing portion 56 of the first panel 28. The first slanted bevel 140 of the first panel 28 may be configured to neighbor a slanted bevel 144 of the second panel 32 in the closed state. For example, in a closed position, the slanted bevels 140, 144 may be substantially parallel (e.g., differ by less than 5 degrees) and narrowly spaced, such as between 0.25 inch and 1 inch, such as between 0.5 inch to 0.75 inch, such as 0.5 inch. Alternatively, the slanted bevel 140 of the first panel 28 may be configured to substantially neighbor one of the longitudinal members 44, 48 (see FIG. 1) of the frame 24 or the wall in the closed position. When the slanted bevel 140 of the first panel 28 is neighbored with the second panel 32, the frame 24, and/or the wall, a continuous visual language may be achieved such that only one seamline is observable, such as a seamline narrower than 0.5 inch, such as narrower than 0.25 inch, such as narrower than 0.1 inch. The slanted bevels 140, 144 may be slanted at 30 degrees or more, such as 40 degrees or more, such as 60 degrees or more (e.g., in respect to a front-facing or a back-facing surface of the first or second panels 28, 32).

Figure 4:
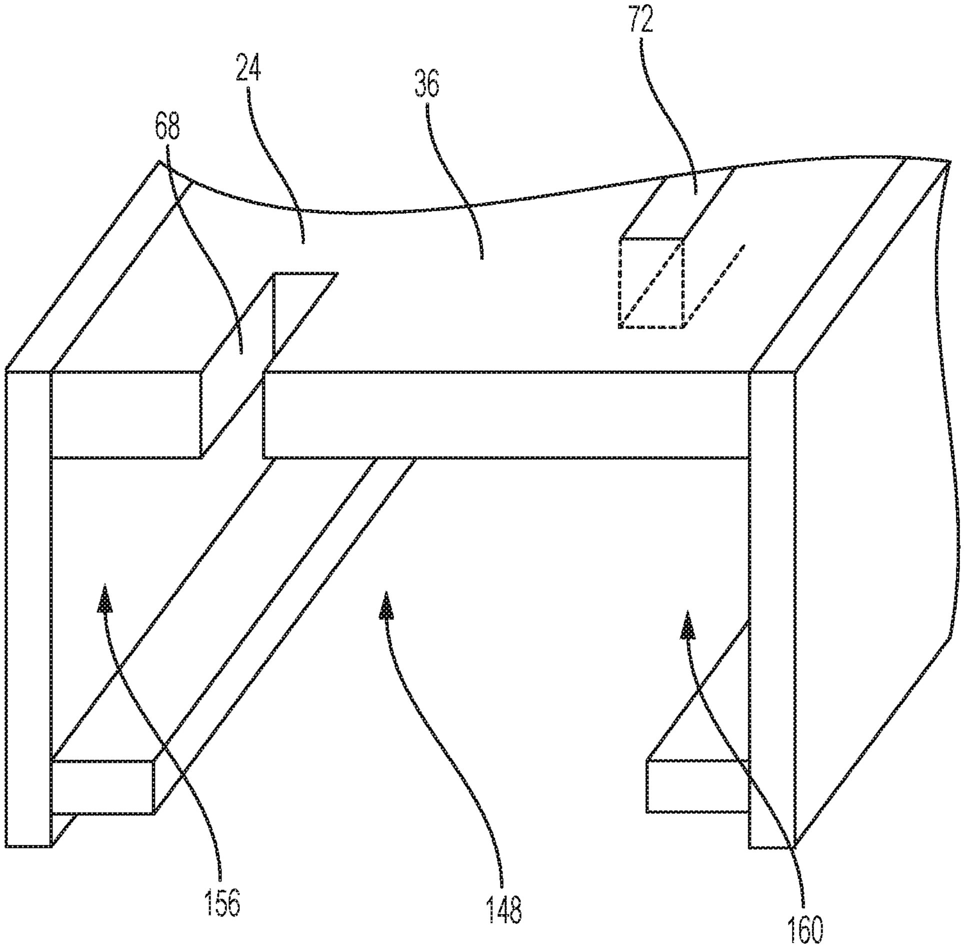
FIG. 4 is a cross-sectional view of the first lateral member of FIG. 2, according to some examples.
Figure 5:
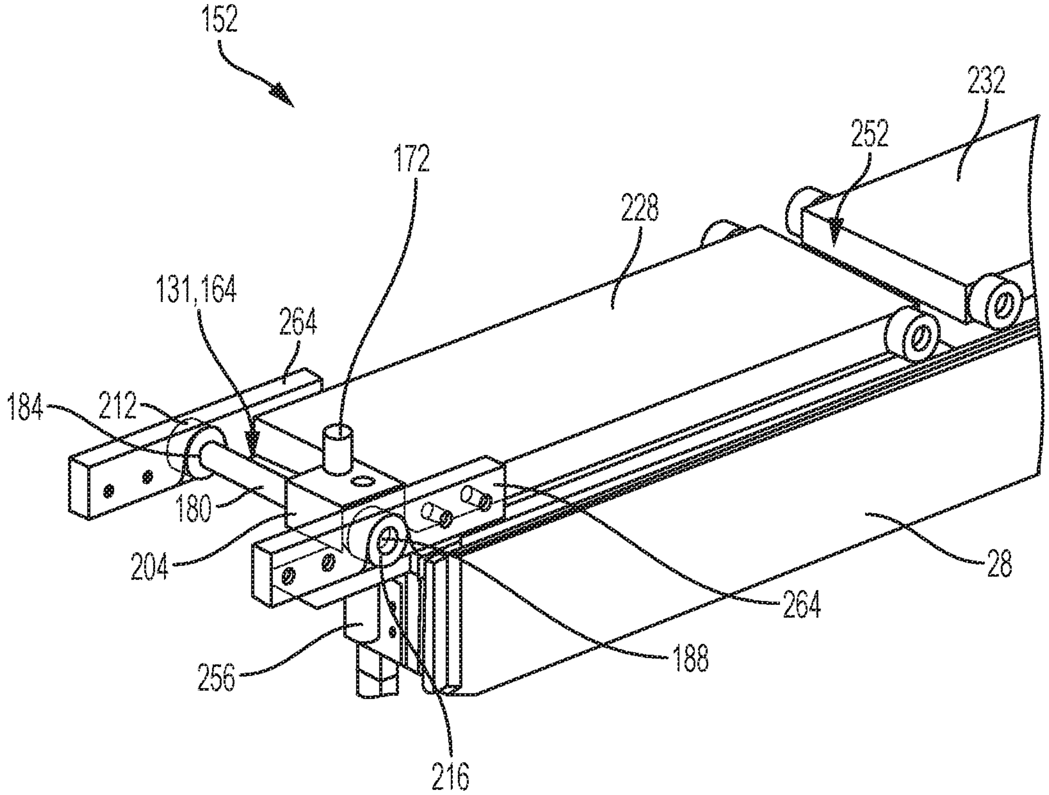
FIG. 5 is a schematic view of a trolley assembly, according to some examples.
Figure 6:
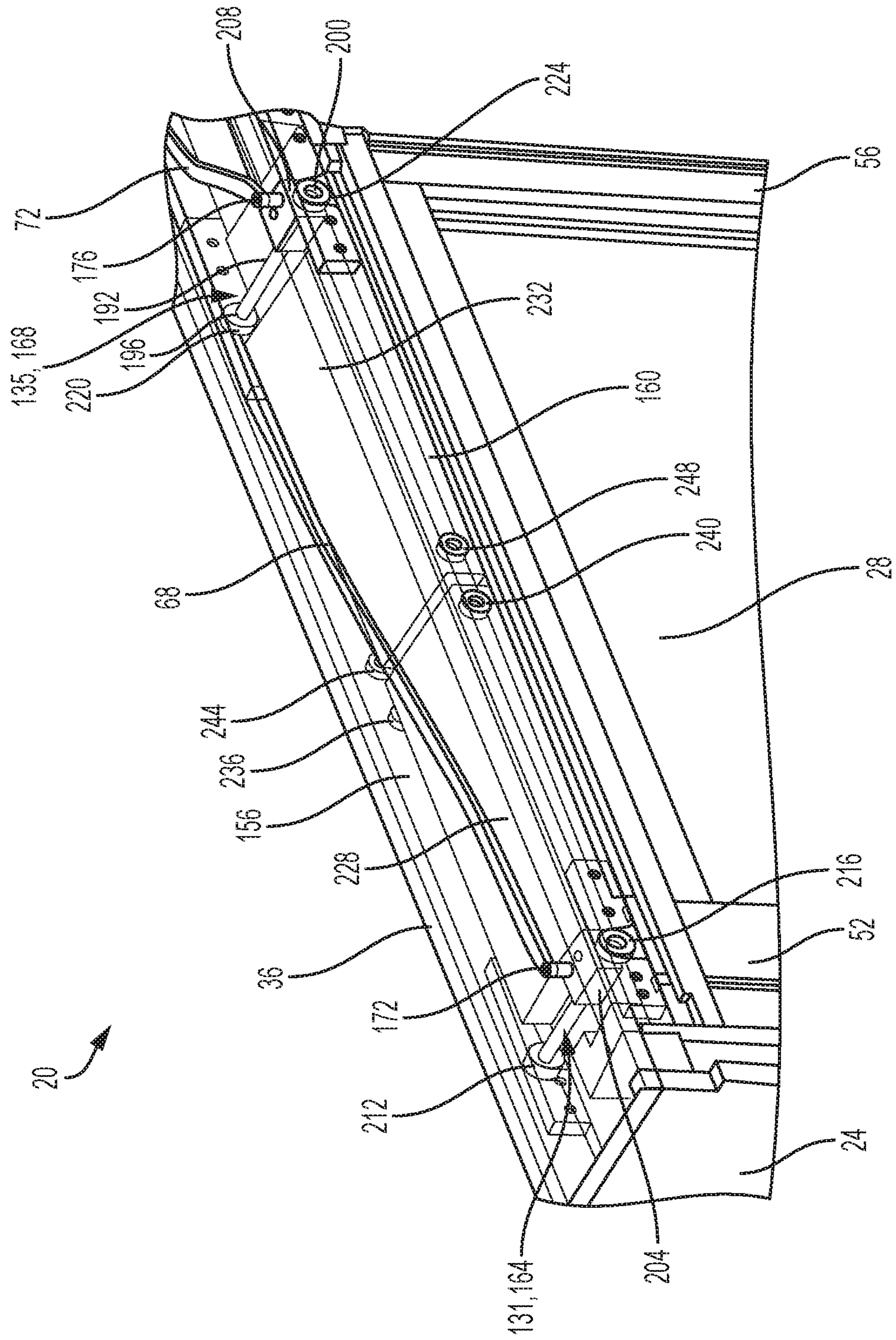
FIG. 6 is a schematic view of the trolley assembly disposed in the first lateral member of FIG. 2, according to some examples.

FIG. 4 is a cross-sectional view of the first lateral member 36, FIG. 5 is a schematic view of a trolley assembly 152, and FIG. 6 is a schematic view of the trolley assembly being slideably received in a trolley space 148 of the first lateral member, according to some examples. The leading track 68 and trailing track 72 are through-recessed into the first lateral member 36 of the frame 24 in the illustrated embodiment. The first lateral member 36 includes a trolley space 148 configured to receive one or more sliding means, which may be one or more conveyors (see FIG. 5). The trolley space 148 extends along the width of the first lateral member 36 of the frame 24. The one or more conveyors may include a first conveyor 131 and a second conveyor 135. The first conveyor 131 may be coupled to the first panel 28 proximate the leading end (e.g., the leading portion 52) of the first panel 28 and slidably engaging the frame 24. The second conveyor 135 may be coupled to the first panel 28 proximate the trailing end (e.g., the trailing portion 56) and slidably engaging the frame 24. The first conveyor 131 may include a first trolley 164 configured to permit two degrees of freedom of movement (e.g., sliding and/or rotating) of the leading end (e.g., the leading portion 52) of the first panel 28 and the second conveyor 135 may include a second trolley 168 configured to permit two degrees of freedom of movement (e.g., sliding and/or rotating) of the trailing end (e.g., the trailing portion 56) of the first panel 28. The first and second trolleys 164, 168 may be part of a trolley assembly 152. In some embodiments, the trolley space 148 may include two or more sections for receiving different parts of the trolley assembly 152. The first lateral member 36 includes a first side channel 156 and a second side channel 160. Similar to the trolley space 148, the channels 156, 160 extend along the width of the first lateral member 36 and may optionally include two or more sections configured to each receive a trolley (e.g., one of the first and second trolleys 164, 168).

As shown, the trolley assembly 152 includes a first trolley 164 configured to be coupled to the leading portion 52 of the first panel 28, and a second trolley 168 configured to be coupled to the trailing portion 56 of the first panel 28. The first trolley 164 may be a first sliding means of the one or more sliding means, and the second trolley 168 may be a second sliding means of the one or more sliding means. The first trolley 164 may be a first conveyor 131 of the one or more conveyors and the second trolley 168 may be a second conveyor 135 of the one or more conveyors. The first trolley 164 may include a guide pin 172, and the second trolley 168 may include a guide pin 176. The guide pin 172 of the first trolley 164 is configured to be slideably received in the leading track 72 of the first lateral member 36 of the frame 24. The guide pin 176 of the second trolley 168 is configured to be slideably received in the trailing track 76 of the first lateral member 36 of the frame 24. The guide pins 172, 176 are configured to guide the first panel 28 out of a coplanar relationship with the second panel 32 when the first panel 28 is slid to the opened state or position, and to guide the first panel 28 into the coplanar relationship with the second panel 32 (see FIG. 1) when the first panel 28 is slid to the closed state or position. The guide pins 172, 176 are configured have longitudinal degree of freedom along the width of the first lateral member 36 and lateral degree of freedom perpendicular to the width of the first lateral member 36.

As shown, the first trolley 164 may include a shaft 180 having a first end 184 and a second end 188. The second trolley 168 may include a shaft 192 having a first end 196 and a second end 200. The first trolley 164 may further include a linear bearing 204 slideably coupled to the shaft 180, rigidly coupled with the guide pin 172, and releasably and/or rotatably coupled to the first panel 28. The second trolley 168 may further include a linear bearing 208 slideably coupled to the shaft 192, rigidly coupled with the guide pin 176, and releasably coupled to the first panel 28. The first trolley 164 may further include a first conveyor bearing 212 rotatably coupled to the first end 184 of the shaft 180, and a second conveyor bearing 216 rotatably coupled to the second end 188 of the shaft 180. The first and/or second conveyor bearings 212, 216 may be anti-friction bearings, low-friction bearings, ball bearings, sliding bearings, rolling bearings, magnetic bearings, and/or omnidirectional bearings. Similarly, the second trolley 168 may further include a first conveyor bearing 220 rotatably coupled to the first end 196 of the shaft 192, and a second conveyor bearing 224 rotatably coupled to the second end 200 of the shaft 192. The first conveyor bearings 212, 220 may be slideably or rollably received in the first side channel 156 of the first lateral member 36, and the second conveyor bearings 216, 224 may be slideably or rollably received in the second side channel 160 of the first lateral member 36.

In various embodiments, the trolley assembly 152 includes a first steering arm 228 and a second steering arm 232. The first steering arm 228 may be coupled to the first trolley 164 and the second steering arm 232 may be coupled to the second trolley 168. The steering arms 228, 232 may be slideably received in the first and second side channels 156, 160 of the first lateral member 36. The first steering arm 228 may include a third conveyor bearing 236 and a fourth conveyor bearing 240. The second steering arm 232 may include a third conveyor bearing 244 and a fourth conveyor bearing 248. The third conveyor bearings 236, 244 may be movably (e.g., slideably or rollably) coupled to the first side channel 156 of the first lateral member 36. The fourth conveyor bearings 240, 248 may be movably (e.g., slideably or rollably) coupled to the second side channel 160 of the first lateral member 36. The third and/or fourth conveyor bearings may be anti-friction bearings, low-friction bearings, ball bearings, sliding bearings, rolling bearings, magnetic bearings, and/or omnidirectional bearings. In some embodiments, a gap 252 with variable width may be defined between the first and second steering arms 228, 232. The width of the gap 252 changes while the fenestration unit 20 transitions between the closed state and the opened state as a result of the non-linear guiding means such as the leading track 68 and trailing track 72 of the first lateral member 36.

As shown, the trolley assembly 152 may include one or more stabilizing members 264 configured to be positioned in the first and/or the second side channels 156, 160. The one or more stabilizing members 264 may be operatively coupled to the conveyor bearings 212, 216, 220, 224 to be movable in the side channels 156, 160. The stabilizing members 264 may be configured to improve stability and reduce rattling as the fenestration unit transition between the closed and opened positions (i.e., when the conveyor bearings move along the side channels). The fenestration unit 20 may further include one or more releasable members including a first releasable member 256 (see FIG. 5) and optionally a second releasable member. The first releasable member 256 may be configured to releasably couple the linear bearing 204 of the first trolley 164 to the leading portion 52 of the first panel 28. The second releasable member may be configured to releasably couple the linear bearing 208 of the second trolley 168 to the trailing portion 56 of the first panel 28.

Figure 7:
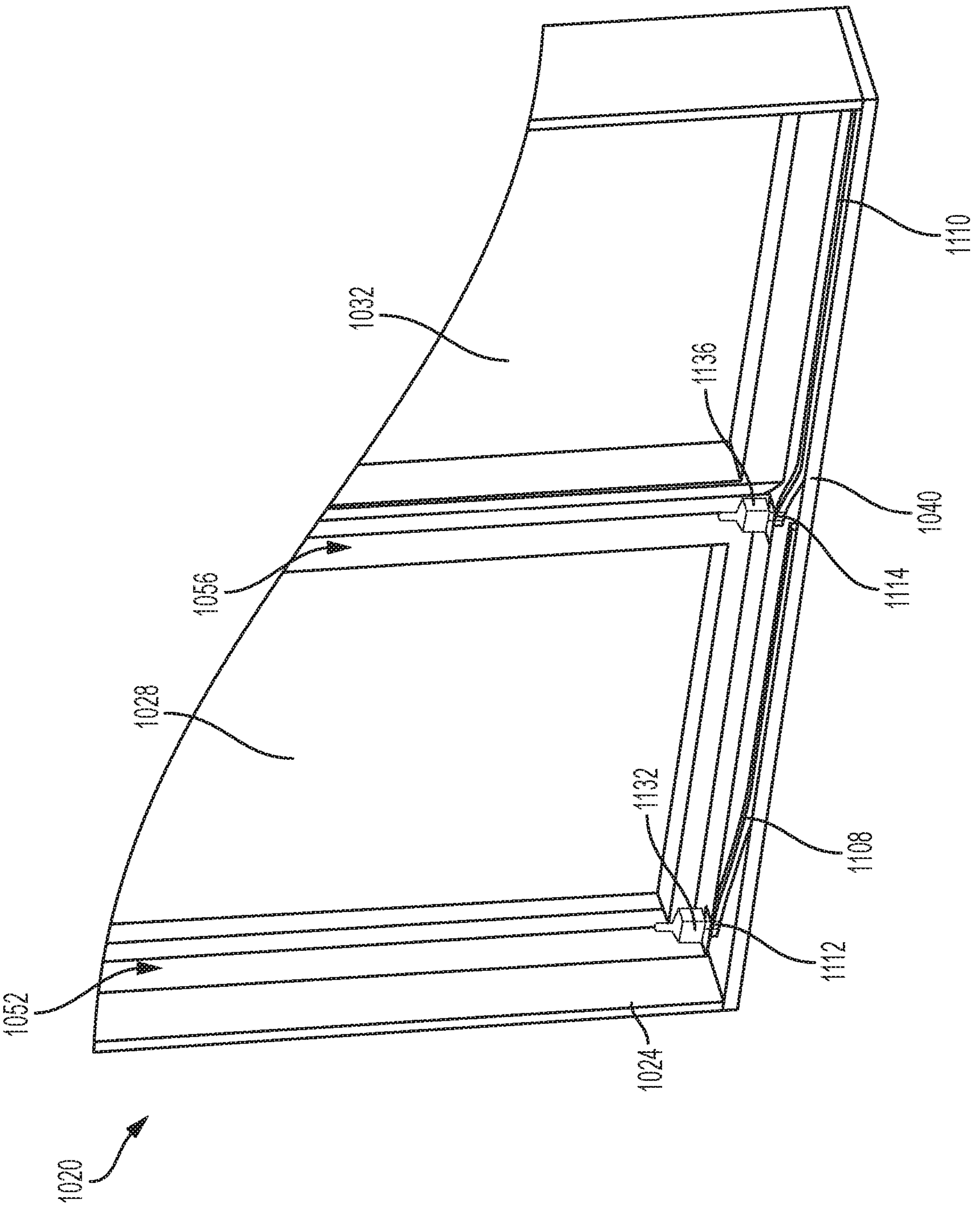
FIG. 7 is a schematic view of a second lateral member, according to some examples.

FIG. 7 is a schematic view of the second lateral member 1040 according to various embodiments. The fenestration unit 1020 may be similar to the fenestration unit 20, with similar features and functionality included as desired. Restated, it is contemplated the various features of the fenestration unit 20 can be substitutes and/or added to the fenestration unit 1020 and vice versa. With the foregoing in mind, fenestration unit 1020 may include one or more sliding means configured to be coupled to the first panel 1028 and be slideably coupled to the frame 1024 to help transition the fenestration unit 1020 between the closed state and the opened state. The one or more sliding means may be one or more conveyors, which may be one or more support bearings coupled to the first panel 1028 such that the support bearings may slide or roll across the second lateral member 1040 of the frame 1024. The one or more support bearings may be configured to support the first panel 1028 and may be configured to be slid or roll omnidirectionally or multi-directionally on the second lateral member 1040 of the frame 1024. An example of a support bearing may be that is sold under the tradename "9820 OMNITRACK HIGH CAPACITY BALL TRANSFER UNIT" by OMNITRACK. The one or more support bearings may include a first support bearing 1132 and a second support bearing 1136.

Figure 8:
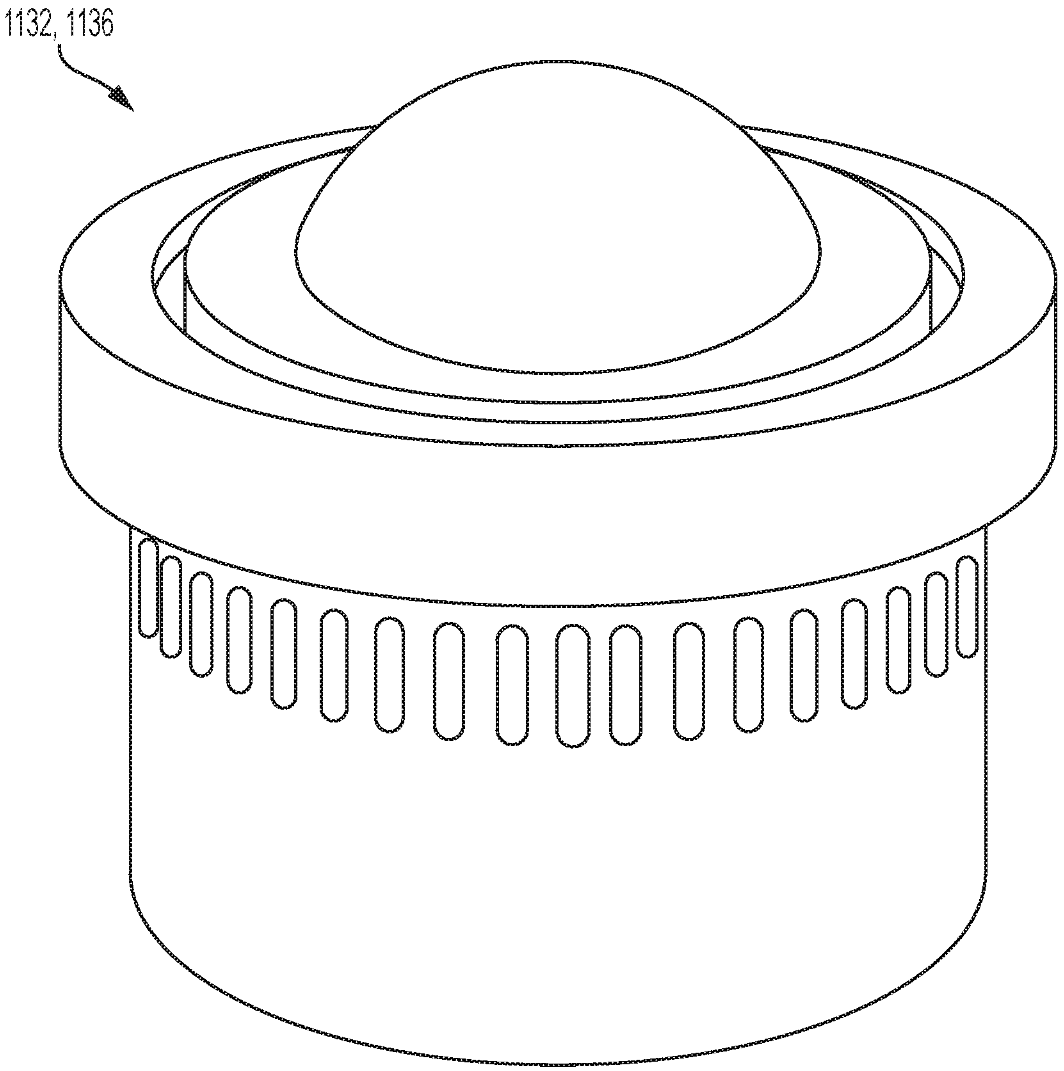
FIG. 8 is a schematic view of a support bearing, according to some examples.

FIG. 8 is a schematic view of a support bearing (e.g., the first support bearing 1132 and/or the second support bearing 1136), according to some examples. As previously referenced, the support bearing may be similar to those sold under the tradename "9820 OMNITRACK HIGH CAPACITY BALL TRANSFER UNIT" by OMNITRACK. The first support bearing 1132 may be disposed near the leading portion 1052 of the first panel 1028 and the second support bearing 1136 may be disposed near the trailing portion 1056 of the first panel 1028. The first support bearing 1132 may be arranged such that it is offset from a first guide pin 1112 by at least the width of the first guide pin laterally and/or longitudinally. Similarly, the second support bearing 1136 may be arranged such that it is offset from a second guide pin 1114 by at least the width of the second guide pin 1114 laterally and/or longitudinally. The first and/or second support bearings 1132, 1136 may be anti-friction bearings, low-friction bearings, ball bearings, sliding bearings, rolling bearings, magnetic bearings, and/or omnidirectional bearings.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

REFERENCE NUMBERS

20 fenestration unit
24 frame
28 first panel
32 second panel
36 first lateral member of the frame
40 second lateral member of the frame
44 first longitudinal member
48 second longitudinal member
52 leading portion of the first panel
56 trailing portion of the first panel
60 first guiding means
64 second guiding means
68 leading track
72 trailing track
76 leading end of the leading track
80 trailing end of the leading track
84 one or more arced section
88 leading end of the trailing track
92 trailing end of the trailing track
96 angled section of the trailing track
100 first straight section of the trailing track
108 first track of the second lateral member
110 second track of the second lateral member
112 first guide pin (bottom)
114 second guide pin (bottom)
131 first conveyor
135 second conveyor
140 first slanted bevel of the first panel
144 first slanted bevel of the second panel
148 trolley space
152 trolley assembly
156 first side channel of the first lateral member
160 second side channel of the first lateral member
164 first trolley
168 second trolley
172 guide pin of the first trolley
176 guide pin of the second trolley
180 shaft of the first trolley
184 first end of the shaft of the first trolley
188 second end of the shaft of the first trolley
192 shaft of the second trolley
196 first end of the shaft of the second trolley
200 second end of the shaft of the second trolley
204 linear bearing of the first trolley
208 linear bearing of the second trolley
212 first conveyor bearing of the first trolley
216 second conveyor bearing of the first trolley
220 first conveyor bearing of the second trolley
224 second conveyor bearing of the second trolley
228 first steering arm
232 second steering arm 236 third conveyor bearing of the first steering arm
240 fourth conveyor bearing of the first steering arm
244 third conveyor bearing of the second steering arm
248 fourth roller of the second steering arm
252 gap between the first and second steering arms
256 first releasable member
264 one or more stabilizing members
1020 fenestration unit
1024 frame
1028 first panel
1036 first lateral member
1040 second lateral member
1052 leading portion of first panel
1056 trailing portion of first panel
1112 first guide pin
1114 second guide pin
1132 first support bearing
1136 second support bearing

What is claimed is:

1. A fenestration unit comprising:

a frame defining a first plane and a second plane and including a first guide track and a second guide track, the first and second guide tracks each including a first straight section and a first arced section, the first arced section including a first curve in a first direction and a second curve in a second direction, and the second guide track including a second straight section near a leading end of the second guide track, the first arced section of the second guide track being positioned between the first and second straight sections of the second guide track;

a first panel supported by the frame having a leading portion and a trailing portion, the first panel operable to be positioned in a closed position and an open position, the first panel being positioned in the first plane in the closed position and in the second plane in the open position;

a second panel supported by the frame and having a closed position in which the first panel is positioned in the first plane;

a first guiding member slidably coupling the leading portion of the first panel to the first guide track, the first guiding member operable to move linearly relative to the frame; and a second guiding member slidably coupling the trailing portion of the first panel to the second guide track, the second guiding member operable to move linearly relative to the frame.

2. The fenestration unit of claim 1, wherein the first guiding member includes a first linear bearing rotatably coupled to the first panel and slidable along the first guiding member in a transverse direction such that the leading portion of the first panel travels along a path defined by the first guide track when the first guiding member travels linearly along the frame.

3. The fenestration unit of claim 2, wherein the second guiding member includes a second linear bearing rotatably coupled to the first panel and slidable along the second guiding member in a transverse direction such that the trailing portion of the first panel travels along a path defined by the second guide track when the second guiding member travels linearly along the frame.

4. The fenestration unit of claim 3, wherein the first and second guiding members and the first and second linear bearings do not rotate relative to the frame.

5. The fenestration unit of claim 1, wherein the first panel is a vent panel and the second panel is a fixed panel.

6. The fenestration unit of claim 1, wherein the first panel is a vent panel and the second panel is a hinged panel.

7. The fenestration unit of claim 1, wherein each of the first and second guiding members includes a shaft, each linear bearing of the first and second linear bearings being slidably coupled to the shaft of a respective guiding member of the first and second guiding members.

8. The fenestration unit of claim 7, wherein each of the first and second guiding members includes guide pin coupled to a respective linear bearing of the first and second linear bearings, each guide pin engaged with a respective track of the first and second guide tracks.

9. A fenestration unit comprising:

a first panel having a leading end and a trailing end, a leading pin positioned proximate the leading end, and a trailing pin positioned proximate the trailing end;

a second panel; and a frame including:

a first guide track receiving the leading pin of the first panel, and a second guide track receiving the trailing pin of the first panel, the first and second guide tracks each including a first straight section and a first arced section, the first arced section including a first curve in a first direction and a second curve in a second direction, and the second guide track including a second straight section near a leading end of the second guide track, the first arced section of the second guide track being positioned between the first and second straight sections of the second guide track.

10. The fenestration unit of claim 9, wherein the second straight section is operable to reduce movement of the first panel under wind load.

11. The fenestration of claim 9, wherein the first guide track includes a second straight section near a leading end of the first guide track, the arced section being positioned between the first and second straight sections of the first guide track.

12. The fenestration of claim 9, wherein the arced section of the second guide track is positioned closer to a trailing end of the second guide track relative to a position of the arced section of the first guide track to a trailing end of the first guide track.

13. The fenestration unit of claim 9, further comprising:

a first guiding member slidably coupling the leading portion of the first panel to the first guide track, the first guiding member operable to move linearly relative to the frame; and a second guiding member slidably coupling the trailing portion of the first panel to the second guide track, the second guiding member operable to move linearly relative to the frame.

14. The fenestration unit of claim 13, wherein the first guiding member includes a first linear bearing rotatably coupled to the first panel and slidable along the first guiding member in a transverse direction such that the leading portion of the first panel travels along a path defined by the first guide track and the first guiding member travels linearly.

15. The fenestration unit of claim 14, wherein the second guiding member includes a second linear bearing rotatably coupled to the first panel and slidable along the second guiding member in a transverse direction such that the trailing portion of the first panel travels along a path defined by the second guide track and the second guiding member travels linearly.

16. A method of assembling a fenestration unit, comprising:

installing a first panel with a frame, the frame defining a first plane and a second plane and including a first guide track and a second guide track, the first panel including a leading portion and a trailing portion, the leading portion of the first panel being engaged with the first guide track via a first guiding member, the trailing portion of the first panel being engaged with the second guide track via a second guiding member, the first and second guiding members operable to move linearly along the frame when the first panel is moved from a closed position in the first plane to an open position in the second plane, the first and second guide tracks each including a first straight section and a first arced section, the first arced section including a first curve in a first direction and a second curve in a second direction, and the second guide track including a second straight section near a leading end of the second guide track, the first arced section of the second guide track being positioned between the first and second straight sections of the second guide track;

installing a second panel with the frame, the second panel including a leading portion and a trailing portion, the second panel being positioned in the first plane.

17. The method of claim 16, wherein installing the first panel includes engaging a first linear bearing of the first guiding member with the first guide track, the first linear bearing being rotatably coupled to the first panel and slidable along the first guiding member in a transverse direction such that the leading portion of the first panel travels along a path defined by the first guide track and the first guiding member travels linearly.

18. The method of claim 17, wherein installing the first panel includes engaging a second linear bearing of the second guiding member with the second guide track, the second linear bearing being rotatably coupled to the first panel and slidable along the second guiding member in a transverse direction such that the trailing portion of the first panel travels along a path defined by the second guide track and the second guiding member travels linearly.

19. The method of claim 17, further comprising sliding the first panel along the first and second guide tracks.

* * * * *